UNITED STATES PATENT OFFICE.

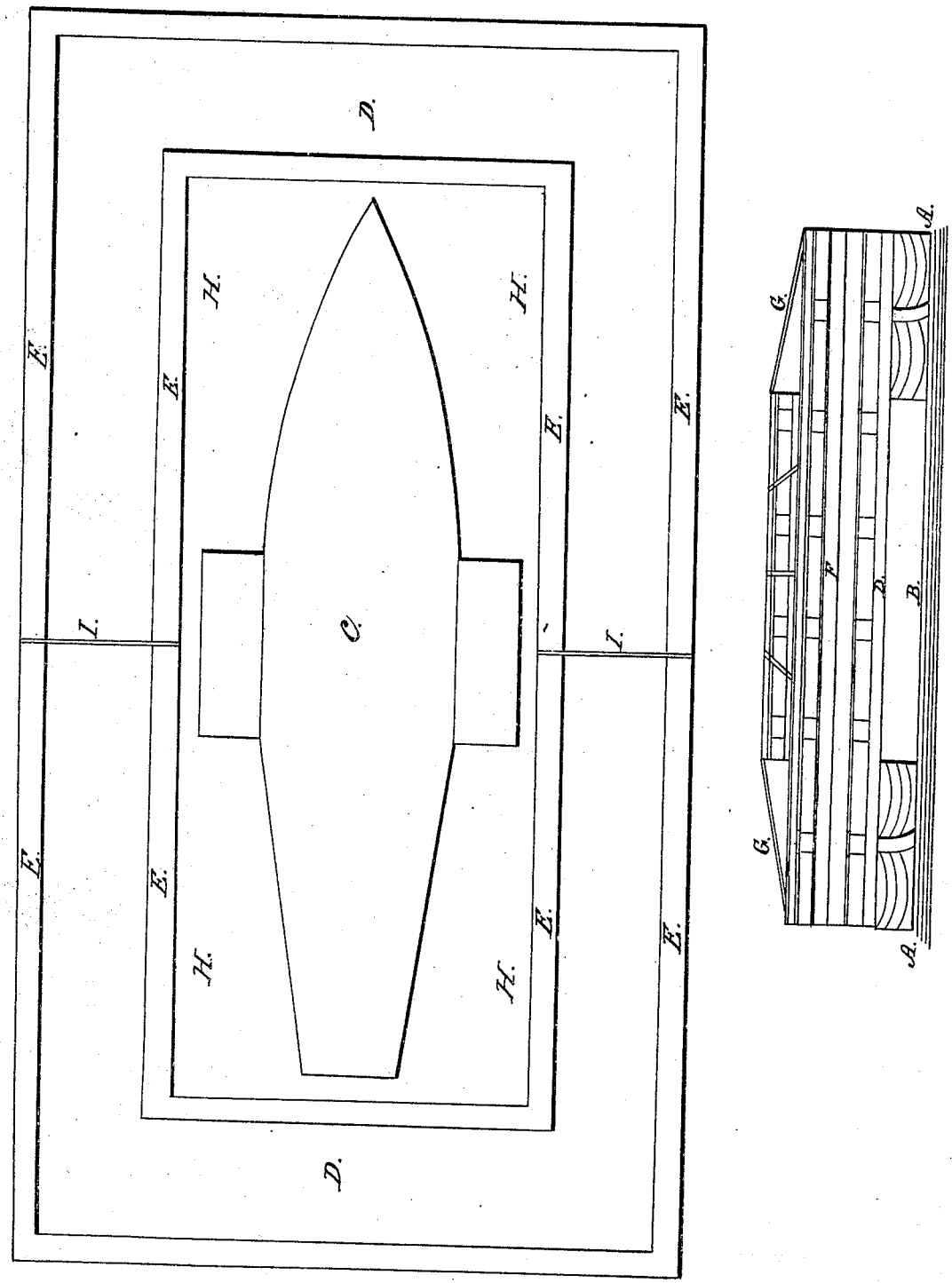
P. Martin,
Floating Batteries.
Nº 2,217.    Patented Aug. 11, 1841.

PROSPER MARTIN, OF PHILADELPHIA, PENNSYLVANIA.

IMPROVEMENT IN FLOATING BATTERIES.

Specification forming part of Letters Patent No. 2,217, dated August 11, 1841.

*To all whom it may concern:*

Be it known that I, PROSPER MARTIN, of the city of Philadelphia, in the county of Philadelphia, State of Pennsylvania, have invented a Locomotive-Battery; and I do declare the following is a full and exact description.

The nature of my invention consists in the conversion of any steamboat into locomotive-battery for the protection of our cities and bays.

To enable others skilled in the art to make and use my invention, I will proceed to describe its construction and operation. (See the draft.)

A A are two boats, parting in the center at I I.

B is the space to be occupied by the steamboat C when required to be used.

C is the steamboat position in the center of the battery.

D D D is the platform resting on the boats A A.

E E E E E E E are ground-lines for the erection of the bulwark around the steamboat and the battery F.

F represents the battery and port-holes or embrasures.

G G represent the frame-work to support an awning to protect the men during a cruise, and so constructed as to be removed during an action.

H H H H represent space to be occupied for barracks or otherwise.

I I represent the separating-line of the battery into two parts for the admission of the steamboat C.

A platform of any given dimension and thickness D D D is constructed on separate bodies A A of logs, boats, or scows of iron or wood or any other materials most convenient to be had. In the interior of this platform and between those bodies a vacancy is left sufficient to admit a steamboat C or steamboats, as the case may require, leaving sufficient room for erecting a bulwark E E E E round the steamboat of a sufficient height and thickness to protect her works, and a space for maneuvering the cannons besides erecting a breastwork or battery F on the outside of said platform, such as may be thought most effectual, of wood, cotton, or any other materials of one or more tiers of cannons. At the center I I the platform opens or otherwise to admit a steamboat when the battery is required for use, and after it is entered the two halves are closed and fastened by means of iron chains, clamps, ropes, or otherwise, after which the steamboat is made fast to the battery and is ready to propel it to the required place. Having dislodged the enemy, the battery is returned to its anchorage, and the steamboat let out to pursue her vocation until wanted again.

Suppose four hulks of sloops or any other hollow vessel A A to be fitted for the support of the platform D D D, having four valves, plugs, or any other contrivance fitted to their bottom, and likewise four or more powerful pumps in their holds. Now, when the four valves are shut, the water being kept out, the platform would float at a given height, keeping it clear of the water, and thus not impeding its progress unnecessarily. Arrived within the limit of the enemy's fire, the steamboat-fastenings are slackened, the four valves are opened, and the battery sunk to the required level, at which point they are shut, or in other cases it would be found necessary to ground on a beach or shoal, &c., after which should it be found expedient to remove the battery the pumps are set to work and by freeing the vessel of their water their buoyancy is regained and the battery ready for removal.

Those locomotive-batteries combine the advantage of stationary forts and steam-frigates at a much less expense, being able to go in quest of the enemy, protecting the small villages along the rivers and bays, at other times sunk and becoming stationary forts in any place required, manned by volunteers, and always ready to repel an enemy.

For the protection of our railroads lighter ones could be constructed to dislodge parties of marines or regulars sent by the enemy to destroy them by using the locomotive-engines in lieu of steamboats.

The shape of those locomotive-batteries may be various—square, angular, round, or any other shape to suit the purpose, and stationary engines in lieu of steamboats can be used. Likewise, if necessary, they may be made to act as two separate batteries by attaching a steamboat to each half, to block up a narrow passage or attack an enemy on both sides. In case of using stationary engines they could be made bomb-proof.

What I claim as my invention, and desire to secure by Letters Patent, is—

The conversion of our common steamboats into locomotive-batteries for the protection of our harbors, cities, villages, &c., by securing the steamboats, in part or in whole, in an incasement, single or double, sufficient to protect them from injury, in manner substantially as herein described.

PROSPER MARTIN.

Witnesses:
   PETER HAY,
   W. WHILLDIN.